US009588817B2

(12) United States Patent
Yamauchi et al.

(10) Patent No.: US 9,588,817 B2
(45) Date of Patent: Mar. 7, 2017

(54) SCHEDULING METHOD AND SCHEDULING SYSTEM FOR ASSIGNING APPLICATION TO PROCESSOR

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Tetsuo Hiraki, Kawasaki (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 412 days.

(21) Appl. No.: 13/946,361

(22) Filed: Jul. 19, 2013

(65) Prior Publication Data
US 2013/0312002 A1 Nov. 21, 2013

Related U.S. Application Data

(63) Continuation of application No. PCT/JP2011/051118, filed on Jan. 21, 2011.

(51) Int. Cl.
*G06F 9/46* (2006.01)
*G06F 9/50* (2006.01)
*G06F 9/48* (2006.01)

(52) U.S. Cl.
CPC .......... *G06F 9/5027* (2013.01); *G06F 9/4881* (2013.01); *G06F 9/5083* (2013.01)

(58) Field of Classification Search
None
See application file for complete search history.

(56) References Cited

U.S. PATENT DOCUMENTS

| 2004/0160446 | A1  |  8/2004 | Gosalia et al. |
|---|---|---|---|
| 2005/0278712 | A1* | 12/2005 | Buskens .................. G06F 9/505 717/148 |
| 2007/0165525 | A1* |  7/2007 | Kageyama ............ G06F 9/5072 370/230 |
| 2007/0186024 | A1* |  8/2007 | Aberg ................... G06F 9/4812 710/269 |
| 2008/0069117 | A1  |  3/2008 | Murata |
| 2008/0109817 | A1* |  5/2008 | Nakamura ............ G06F 9/5033 718/105 |
| 2008/0133741 | A1  |  6/2008 | Kubota |

(Continued)

FOREIGN PATENT DOCUMENTS

| JP | 10-207717 | 8/1998 |
|---|---|---|
| JP | 2004-272894 | 9/2004 |

(Continued)

OTHER PUBLICATIONS

International Preliminary Report on Patentability for PCT/JP2011/051118, mailed Aug. 1, 2013, 11 pages.

(Continued)

*Primary Examiner* — Tammy Lee
(74) *Attorney, Agent, or Firm* — Staas & Halsey LLP

(57) ABSTRACT

A scheduling method executed by a scheduler that manages multiple processors, includes detecting based on an application information table when a first application is started up, a processor that executes a second application that is not executed concurrently with the first application; and assigning the first application to the processor.

5 Claims, 10 Drawing Sheets

(56) References Cited

U.S. PATENT DOCUMENTS

2010/0050184 A1* 2/2010 Lin ................... G06F 9/30043
718/107
2010/0262971 A1 10/2010 Yamada
2012/0265804 A1* 10/2012 Ashcraft ............. G06F 9/5016
709/203

FOREIGN PATENT DOCUMENTS

| JP | 2008-77295 | 4/2008 |
|----|-----------|--------|
| JP | 2008-140120 | 6/2008 |
| JP | 4413924 | 2/2010 |
| WO | WO 2005/010737 A2 | 2/2005 |
| WO | WO 2010/010723 A1 | 1/2010 |

OTHER PUBLICATIONS

Japanese Office Action dated Jan. 6, 2015 in corresponding Japanese Patent Application No. 2012-553538.
International Search Report mailed Apr. 26, 2011 in corresponding International Application No. PCT/JP2011/051118.

* cited by examiner

FIG.4

USE CASE TABLE — 400

| APP NAME | CONTEXT COST | CONCURRENTLY EXECUTED APP | EXPECTED VALUE |
|---|---|---|---|
| APP #0 | 100 [us] | APP #3 | 0.4 |
|  |  | APP #4 | 0.6 |
|  |  | APP #5 | 0.5 |
| APP #1 | 1 [ms] | APP #3 | 0.5 |
|  |  | APP #4 | 0.6 |
|  |  | APP #5 | 0.1 |
| APP #2 | 100 [us] | APP #4 | 0.6 |
| APP #3 | 500 [us] | APP #0 | 0.4 |
|  |  | APP #1 | 0.5 |
|  |  | APP #5 | 0.25 |
| APP #4 | 250 [us] | APP #0 | 0.6 |
|  |  | APP #1 | 0.6 |
|  |  | APP #2 | 0.6 |
|  |  | APP #5 | 0.3 |
| APP #5 | 200 [us] | APP #0 | 0.5 |
|  |  | APP #1 | 0.1 |
|  |  | APP #3 | 0.25 |
|  |  | APP #4 | 0.3 |
| ⋮ | ⋮ | ⋮ | ⋮ |

- 400-1: APP #0
- 400-2: APP #1
- 400-3: APP #2
- 400-4: APP #3
- 400-5: APP #4
- 400-6: APP #5

FIG.8  CANDIDATE-ASSIGNMENT-DESTINATION COST TABLE ~800

| CPU NAME | TOTAL COST |
|---|---|
| CPU #0 | 150 [us] |
| CPU #1 | 200 [us] |

FIG.9  CANDIDATE-MIGRATION-DESTINATION COST TABLE ~900

| APP NAME | CANDIDATE MIGRATION DESTINATION | TOTAL COST |
|---|---|---|
| APP #0 | CPU #1 | 350 [us] |
| APP #1 | CPU #1 | 400 [us] |

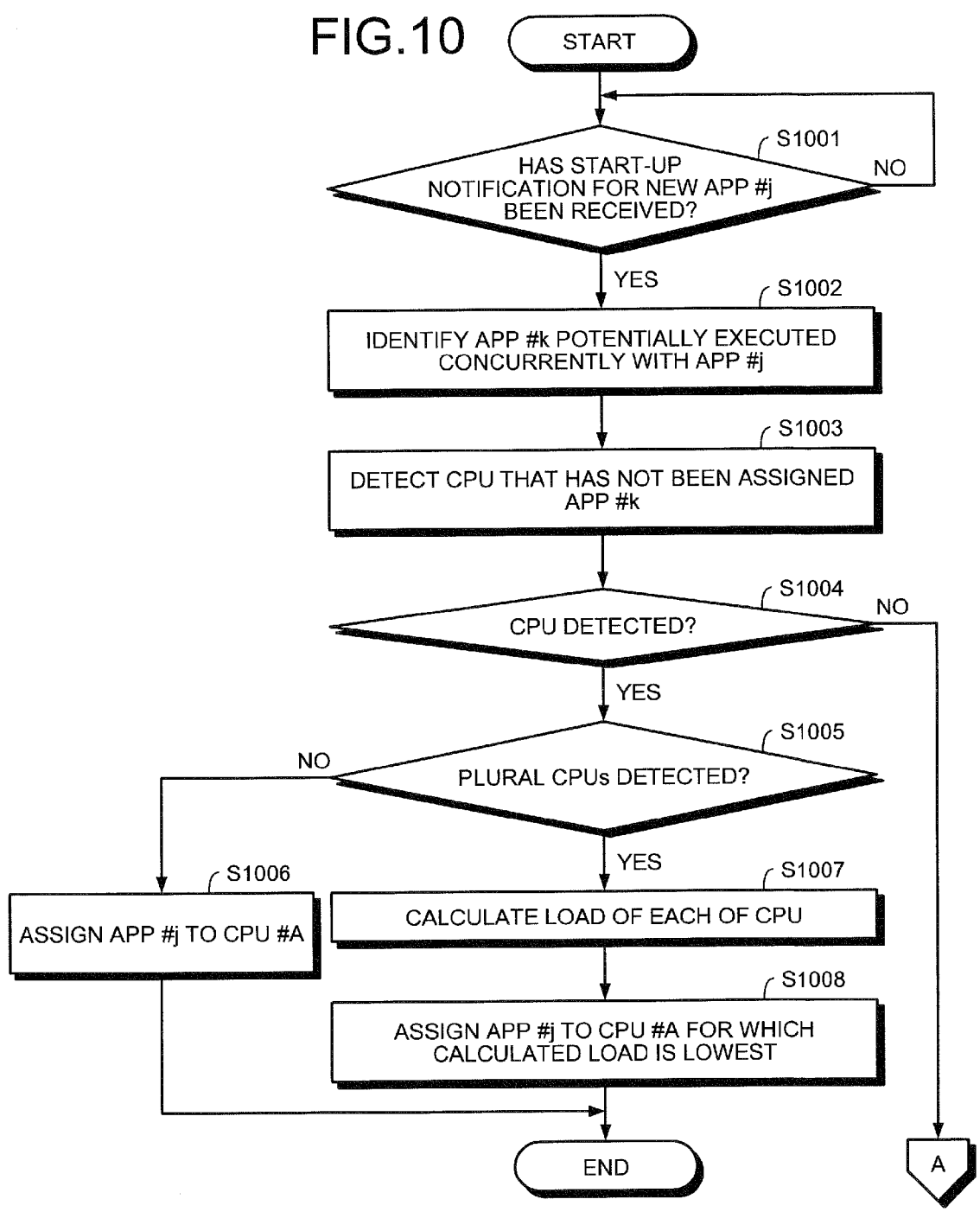

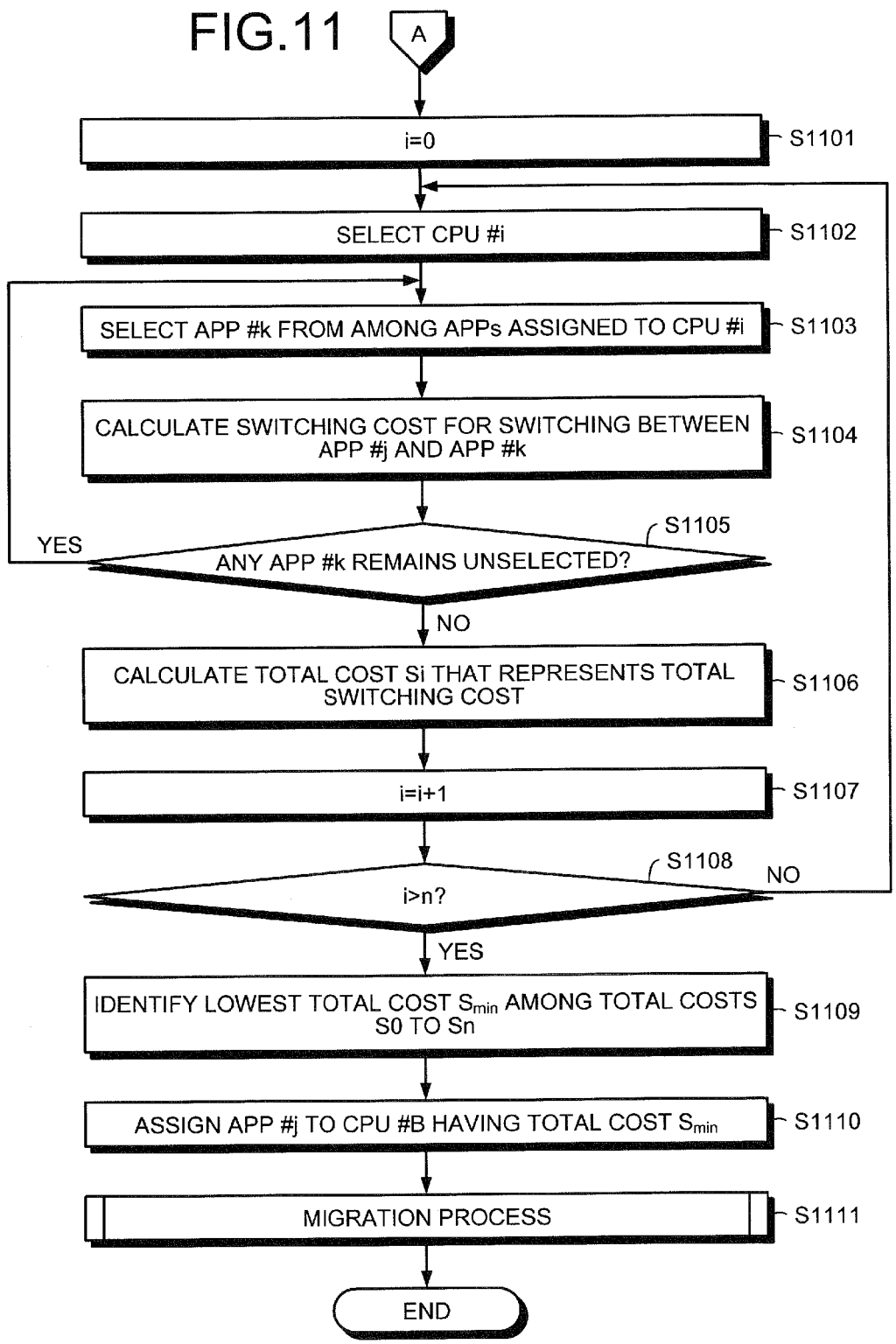

SCHEDULING METHOD AND SCHEDULING SYSTEM FOR ASSIGNING APPLICATION TO PROCESSOR

CROSS-REFERENCE TO RELATED APPLICATIONS

This application is a continuation application of International Application PCT/JP2011/051118, filed on Jan. 21, 2011 and designating the U.S., the entire contents of which are incorporated herein by reference.

FIELD

The embodiment discussed herein is related to a scheduling method and scheduling system.

BACKGROUND

Among many information apparatuses, demands for high performance and low power consumption have recently become strong and therefore, development of a system that uses a multi-core processor is currently implemented to realize higher performance and lower power consumption.

Related conventional techniques include, for example, a technique concerning switching between tasks in a micro computer (see, e.g., Japanese Laid-Open Patent Publication Nos. 2004-272894 and H10-207717). A technique is also present concerning power control of plural processor cores (see, e.g., Japanese Patent No. 4413924)

However, in a conventional multi-core processor system, during a multi-task operation, applications that are frequently switched to, may be assigned to the same CPU. Therefore, a problem arises in that the time consumed for the switching of the application increases.

SUMMARY

According to an aspect of an embodiment, a scheduling method executed by a scheduler that manages multiple processors, includes detecting based on an application information table when a first application is started up, a processor that executes a second application that is not executed concurrently with the first application; and assigning the first application to the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram of an example of the storage contents of a use case table;

FIG. 8 is an explanatory diagram of an example of the storage contents of a candidate-assignment-destination cost table;

FIG. 9 is an explanatory diagram of an example of the storage contents of a candidate-migration-destination cost table 900;

FIGS. 10 and 11 are flowcharts of an example of a procedure for the scheduling process executed by the scheduler according to the embodiment;

DESCRIPTION OF EMBODIMENTS

An embodiment of a scheduling method and a scheduling system will be described in detail with reference to the accompanying drawings. In the embodiment, the scheduling system is a multi-core processor system that includes a multi-core processor having plural cores. Provided that the multi-core processor includes plural cores, the multi-core processor may be a single processor equipped with plural cores or may be a group of single-core processors connected in parallel. In the embodiment, for simplification of the description, description will be made taking an example of a group of single-core processors connected in parallel.

Figure 1:
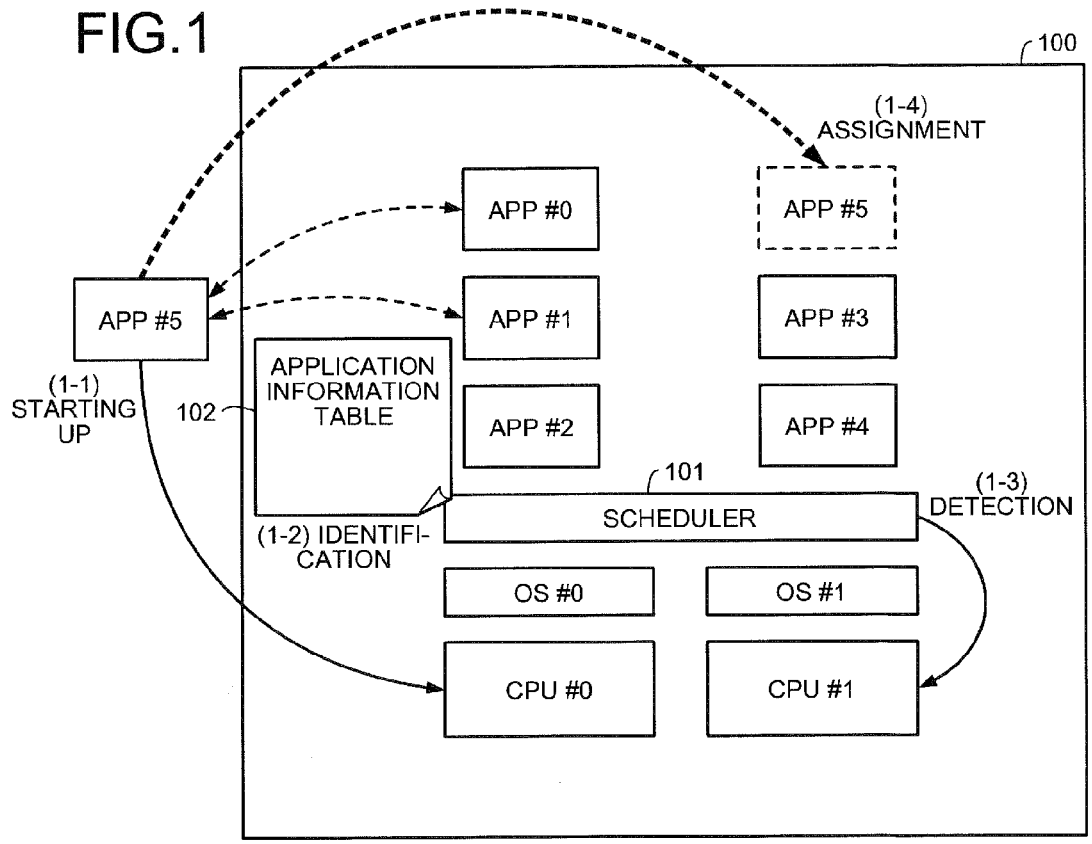
FIGS. 1 and 2 are explanatory diagrams of examples of a scheduling process according to an embodiment.
Figure 2:
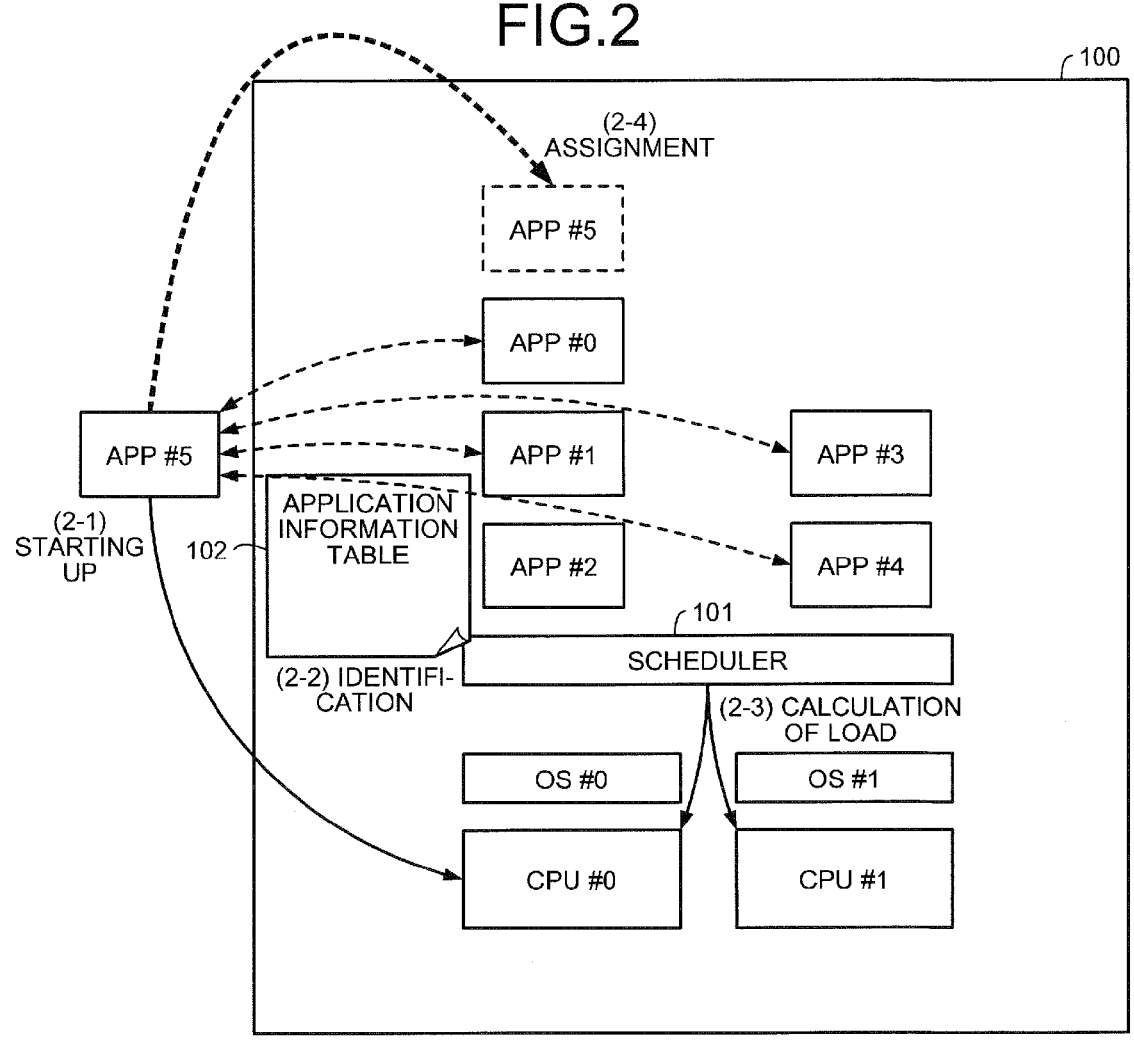

FIGS. 1 and 2 are explanatory diagrams of examples of a scheduling process according to the embodiment. In FIGS. 1 and 2, a multi-core processor system 100 is a scheduling system that includes central processing units (CPUs) #0 and #1.

The CPU #0 executes an operating system (OS) #0 and supervises the control of the entire multi-core processor system 100. The OS #0 is a master OS and includes a scheduler 101 that controls to which CPU an application is assigned. The CPU #0 executes the applications that are assigned thereto. The CPU #1 executes an OS #1 and thereby, executes the application that is assigned to the OS #1. The OS #1 is a slave OS. An expression "a CPU to which an app (application) is assigned" and an expression "an OS to which the app is assigned" are equivalent in meaning.

A first example of the scheduling process of the multi-core processor system 100 will be described with reference to FIG. 1 and taking a case where a new app #5 is started up as an example.

(1-1) The scheduler 101 receives start-up notification for the app #5.

(1-2) The scheduler 101 refers to an application information table 102 and identifies an app that may be concurrently executed with the newly started up app #5, among the apps #0 to #4 that are assigned to the CPUs #0 and #1.

The application information table 102 includes, for each of the applications, information concerning other applications that may be executable concurrently with the application. For example, assuming that the app #5 is a game app, an app such as a moving picture reproduction app or a music reproduction app is an app that has a lower potential of being executed concurrently with the app #5. On the other hand, assuming that the app #5 is a music reproduction app, an app such as an e-mail app or a website browser is an app that has a high potential of being executed concurrently the app #5 compared to the above combination of the game app and the moving picture reproduction app.

The application information table 102 indicates the combinations of apps that have a high potential of being executed concurrently such as the music reproduction app and the e-mail appl. In the example of FIG. 1, the apps #0 and #1 are identified as the apps that may be executed concurrently with the app #5. Detailed description of the application information table 102 will be made later with reference to FIG. 4.

(1-3) The scheduler 101 detects a CPU that executes apps that are not to be executed concurrently with the app #5, from among the CPUs #0 and #1 in the multi-core processor system 100. For example, the scheduler 101 detects the CPU #1, which has not been assigned the apps #0 and #1 that may be executed concurrently with the app #5, from among the CPUs #0 and #1.

(1-4) The scheduler 101 assigns the app #5 to the CPU #1. Thereby, the newly started up app #5 can be assigned to the CPU #1, a CPU other than the CPU #0 that has been assigned the apps #0 and #1 that have a high potential of being executed concurrently with the app #5.

In this manner, the scheduler 101 according to the embodiment enables apps that have a high potential of being executed concurrently with each other to be respectively assigned to different CPUs. As a result, for example, when switching occurs between the apps #5 and #0 (or #1), the context information of the app #0 does not need to be saved and loaded; and therefore, the switching between the apps #5 and #0 can be executed at a high speed.

A second example of the scheduling process of the multi-core processor system 100 will be described with reference to FIG. 2 and taking a case where the app #5 is started up as an example.

(2-1) The scheduler 101 receives start-up notification for the app #5.

(2-2) The scheduler 101 refers to an application information table 102 and identifies an app that may be concurrently executed with the newly started up app #5, among the apps #0 to #4 that are assigned to the CPUs #0 and #1. In the example of FIG. 2, the apps #0, #1, #3 and #4 are identified as apps that may be executed concurrently with the app #5.

(2-3) The scheduler 101 refers to the application information table 102 and calculates the load generated when the app executed by at least one of the CPUs #0 and #1 is switched to the newly started up app #5.

The application information table 102 includes, for each of the applications, context load information of the application. The context load information is information concerning the load on the CPU when an application under execution is switched to another application.

For example, the scheduler 101 calculates the total load on the CPU #0 when the apps #0 and #1 assigned to the CPU #0 are switched to the app #5, based on the context load information of the newly started up app #5. The apps #0 and #1 are apps that may be executed concurrently with the app #5.

The scheduler 101 calculates the total load that is generated when the apps #3 and #4 assigned to the CPU #1 are switched to the app #5, based on the context load information of the newly started up app #5. The apps #3 and #4 are apps that may be executed concurrently with the app #5.

(2-4) The scheduler 101 selects a CPU to execute the app #5, from among the CPUs #0 and #1 and based on the calculated loads and further assigns the app #5 thereto. For example, the scheduler 101 selects the CPU for which the total calculated load is the smallest among the CPUs #0 and #1 and assigns the app #5 thereto. In this example, the CPU #0 is selected and the app #5 is assigned to the CPU #0.

In this manner, the scheduler 101 according to the embodiment enables the CPU to which the newly started up app is to be assigned, to be selected taking into consideration the load that is applied to the CPU due to the switching between apps. As a result, for example, the load that is generated when the switching occurs between the apps #5 and #0 can be suppressed. Consequently, the speed of the switching between the apps can be increased.

The system configuration of a multi-core processor system 300 according to the embodiment will be described. The multi-core processor system 100 depicted in FIGS. 1 and 2 is an example of the multi-core processor system 300 described below.

Figure 3:
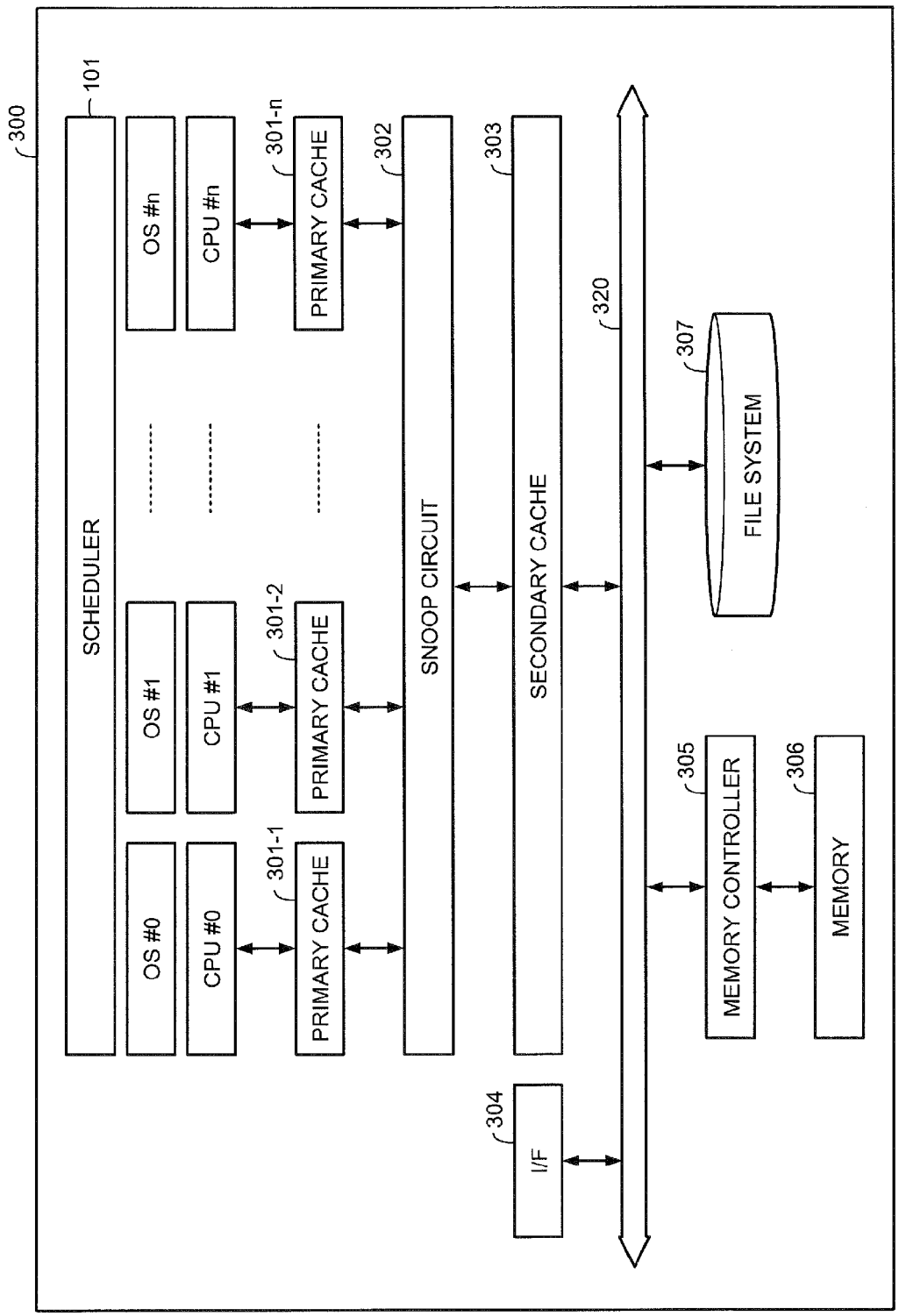
FIG. 3 is an explanatory diagram of an example of a system configuration of a multi-core processor system according to the embodiment.

FIG. 3 is an explanatory diagram of an example of a system configuration of the multi-core processor system according to the embodiment. In FIG. 3, the multi-core processor system 300 includes CPUs #0 to #n, primary caches 301-1 to 301-n, a snoop circuit 302, a secondary cache 303, an interface (I/F) 304, a memory controller 305, and memory 306. In the multi-core processor system 300, the secondary cache 303, the I/F 304, and the memory controller 305 are connected to each other through a bus 320. The memory 306 is connected to each of the above components through the memory controller 305.

The CPU #0 executes the OS #0 and supervises the control of the entire multi-processor system 300. The OS #0 is a master OS and includes the scheduler 101 that controls to which CPU an application is assigned. The CPU #0 executes an application that is assigned thereto. The CPUs #1 to #n respectively execute OSs #1 to #n and thereby, execute the applications that are assigned to the OSs #1 to #n. The OSs #1 to #n are slave OSs.

The CPUs #0 to #n each include a register and a core. Each of the registers includes a program counter and a reset register. Each of the CPUs #0 to #n is connected to the components through the corresponding one of the primary caches 301-1 to 301-n, the snoop circuit 302, and the secondary cache 303.

The primary caches 301-1 to 301-n each includes a cache memory and a cache controller. For example, the primary cache 301-1 temporarily stores a writing process executed by the OS #0 to write from the application to the memory 306. The primary cache 301-1 temporarily stores data that is read from the memory 306.

The snoop circuit 302 establishes coherency among the primary caches 301-1 to 301-n that are accessed by the CPUs #0 to #n. For example, when data shared among the primary cashes 301-1 to 301-n is updated in any one of the primary caches, the snoop circuit 302 detects the updating and updates the other primary caches.

The secondary cache 303 includes a cache memory and a cache controller, and stores data that is saved from the primary caches 301-1 to 301-n. For example, the secondary cache 303 stores data that is shared among the OSs #0 to #n.

The I/F 304 is connected to a network such as a local area network (LAN), a wide area network (WAN), and the Internet via a communication line, and is connected to a device via the network. The I/F 304 supervises the network and an internal interface, and controls the input and output of data with respect to an external device. The I\F 304 may be implemented by a LAN adaptor.

The memory controller 305 controls the reading and writing of data with respect to the memory 306. The memory 306 is memory that is shared among the CPUs #0 to #n and includes read only memory (ROM), random access memory (RAM), and flash ROM, etc.

For example, the flash ROM stores programs of each of the OSs; the ROM stores application programs; and the RAM is used as a work area of the CPUs #0 to #n. Each of the programs stored in the memory 306, when loaded on a CPU, causes the CPU to execute an encoded process.

A file system 307 stores, for example, order codes of the applications and content data such as images and video images, and is realized by, for example, an auxiliary storage device such as a hard disk or an optical disk. Though not depicted, the multi-core processor system 300 may include a display, a keyboard, etc., in addition to a power management unit (PMU) that supplies power voltage to the components.

A use case table 400 used by the scheduler 101 depicted in FIG. 3 will be described. The use case table 400 corresponds to the application information table 102 depicted in FIGS. 1 and 2. The use case table 400 is stored in, for example, the primary cache 301-1, the secondary cache 303, and the memory 306.

FIG. 4 is an explanatory diagram of an example of the storage contents of the use case table. In FIG. 4, the use case table 400 has fields for the app name, a context cost, a concurrently executed app, and an expected value. Application information for each of the apps is stored as a record (for example, records of application information records 400-1 to 400-6) by setting information into the fields.

The "app name" is a name to identify an app. The "context cost" is an index value indicating the load that is incurred for context switching of the app and is represented by, for example, the time consumed for starting up or suspending of the appl. For example, the context cost is represented by the time consumed for saving the context information of the app to the memory 306 (or loading the context information from the memory 306). The "context information" is information such as the value of the program counter of each of the CPUs and the value of a multi-purpose register storing the values of variables in a function.

The "concurrently executed app" is information used to identify an app that has a high potential of being executed concurrently with the app. The "expected value" indicates the rate at which the app is switched to a concurrently executed app and is represented by, for example, the rate at which the app is switched to a concurrently executed app during one execution session of the app.

Taking the application information record 400-1 as an example, a context cost of "100 [us]" is indicated for the app #0. The time consumed for saving (or loading) the context information of the app #0 is 100 [us]. Concurrently executed apps "apps #3, #4, and #5" of the app #0 are also indicated in the application information record 400-1. The apps that have a high potential of being executed concurrently with the app #0 are the apps #3, #4, and #5. The expected value for each of the concurrently executed apps is also indicated in the application information record 400-1. For example, during the execution of the app #0, the rate at which the app #0 is switched to the app #3 is "0.4". For example, during the execution of the app #0, the rate at which the app #0 is switched to the app #4 is "0.6". For example, during the execution of the app #0, the rate at which the app #0 is switched to the app #5 is "0.5".

The context cost of each of the apps in the use case table 400 may be obtained by, for example, measuring the time period for saving the context information of each of the apps using a simulation during the design of the multi-core processor system 300. As to the "concurrently executed app" and the "expected value" of each of the apps in the use case table 400, for example, the OS #0 may calculate the expected value of the number of app switching sessions and may update those items each time a user uses the app.

In the description below, except where otherwise designated, an arbitrary CPU of the CPUs #0 to #n in the multi-core processor system 300 will be denoted by "CPU #i" (i=0, 1, . . . , n).

Figure 5:
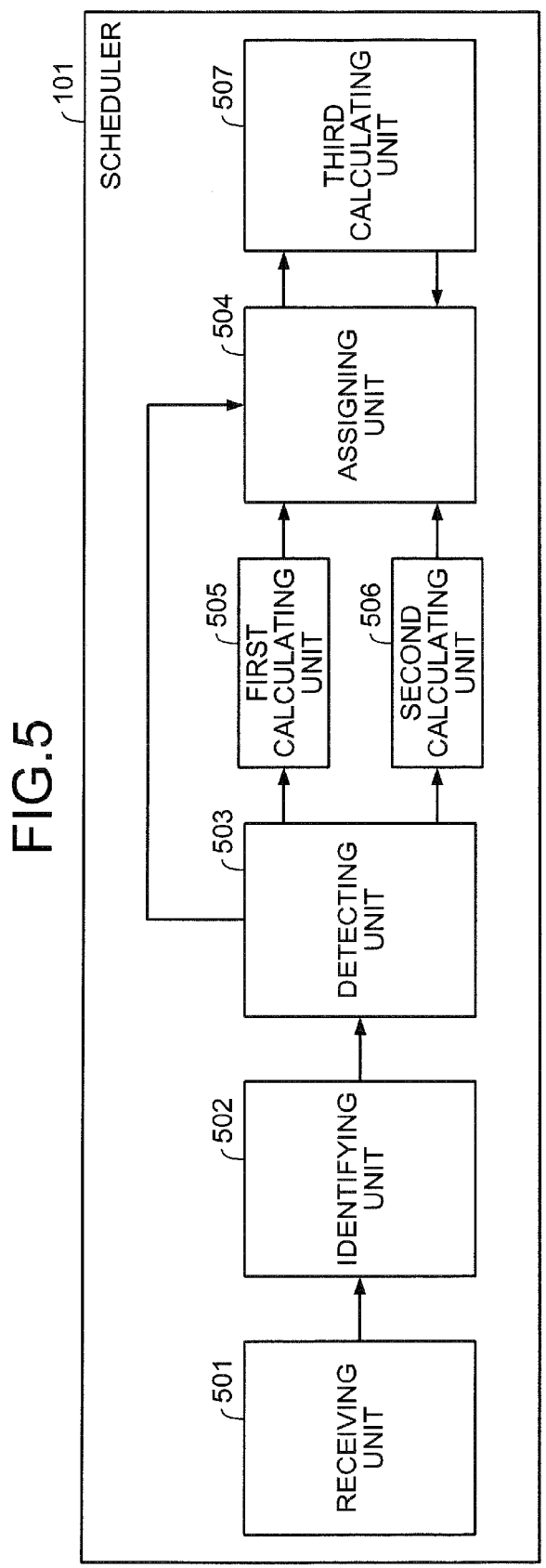
FIG. 5 is a block diagram of a functional configuration of a scheduler according to the embodiment.

An example of a functional configuration of the scheduler 101 will be described. FIG. 5 is a block diagram of a functional configuration of the scheduler according to the embodiment. In FIG. 5, the scheduler 101 includes an receiving unit 501, an identifying unit 502, a detecting unit 503, an assigning unit 504, a first calculating unit 505, a second calculating unit 506, and a third calculating unit 507. Functions of the receiving unit 501 to the third calculating unit 507 are implemented by, for example, causing the CPU #0 to execute the scheduler 101 stored in the memory 306. The processing result of each of the functional units is stored to, for example, the register of the CPU #0, the primary cache 301-1, the secondary cache 303, the memory 306, etc.

The receiving unit 501 receives start-up notification for a new app (hereinafter, referred to as "app #j"). For example, the receiving unit 501 receives the start-up notification for the app #j from the OS #0.

The identifying unit 502 refers to the use case cable 400 (see FIG. 4) and identifies an app that may be concurrently executed with the app #j for which the start-up notification has been received (hereinafter, referred to as "app #k").

A case is assumed as an example where start-up notification for the app #5 is received (j=5). In this case, the identifying unit 502 identifies the application information record 400-6 that corresponds to the app #5 from the use case table 400; refers to the application information record 400-6; and identifies the apps #0, #1, #3, and #4 that may be executed with the app #5.

The detecting unit 503 detects CPUs that have not been assigned the app #k that may be executed concurrently with the new app #j, from among the CPUs #0 to #n of the multi-processor system 300. For example, the detecting unit 503 refers to an assignment table 600 depicted in FIG. 6 and detects the CPUs to which the app #k has not been assigned.

The assignment table 600 includes information indicating the apps that are assigned to the CPUs #0 to #n, that is, for example, the apps registered in the queue of each of the CPUs #0 to #n; and is implemented by, for example, the primary cache 301-1, the secondary cache 303, and the memory 306. The assignment table 600 will be described.

Figure 6:
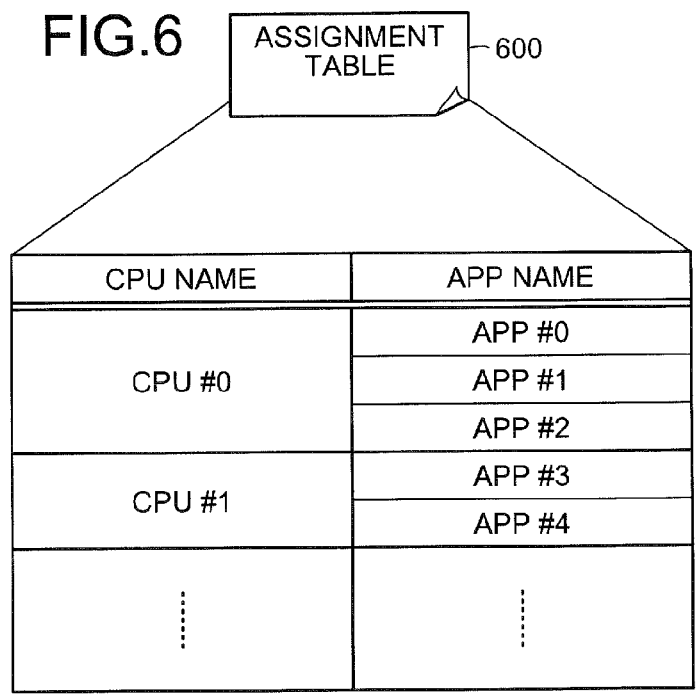
FIG. 6 is an explanatory diagram of an example of the storage contents of an assignment table.

FIG. 6 is an explanatory diagram of an example of the storage contents of the assignment table. In FIG. 6, the assignment table 600 indicates the names of the apps that are assigned to the CPUs #0 to #n. Taking the CPU #0 as an example, the apps #0, #1, and #2 are assigned to the CPU #0. Each time any one of the apps assigned to the CPUs #0 to #n is updated, the storage contents of the assignment table 600 are updated accordingly.

The reference of description returns FIG. 5. The assigning unit 504 assigns the app #j to the detected CPU that has not been assigned the app #k that may be concurrently executed with the new app #j (hereinafter, referred to as "CPU #A"). For example, the assigning unit 504 registers the app #j into the queue for the CPU #A.

Consequently, the new app #j can be assigned to the CPU #A, which has not been assigned the app #k that has a high potential of being executed concurrently with the app #j. As a result, when any switching occurs between the apps #j and #k, the saving and loading of the context information concerning the app #j and of the app #k are unnecessary; and therefore, the switching between the apps can be executed at a high speed.

When plural CPUs that have not been assigned the app #k are detected, the first calculating unit 505 calculates the load on each of the detected CPUs. For example, the first calculating unit 505 calculates the load on the CPU, based on the number of apps assigned to the detected CPU and the execution time period of each of the apps. For example, the first calculating unit 505 may calculate the number of apps assigned to each of the detected CPUs as the load on each of the CPUs.

The assigning unit 504 selects the CPU #A to be the assignment destination of the new app #j from among the detected CPUs based on the load on each of the detected CPUs. For example, the assigning unit 504 selects the CPU #A whose calculated load is the smallest, from among the detected CPUs. The assigning unit 504 assigns the app #j to the selected CPU #A.

Thereby, the new app #j can be assigned to the CPU #A whose load is the smallest, among the CPUs that have not been assigned the app #k that has a high potential of being executed concurrently with the app #j. As a result, switching between the apps can be executed at a high speed and the performance of the entire system can be improved by distributing the load among the CPUs #0 to #n.

When no CPU that has not been assigned the app #k is detected, the second calculating unit 506 calculates the load generated by switching between the new app #j and the app #k that is assigned to the CPU #i (hereinafter, referred to as "switching cost").

For example, the second calculating unit 506 calculates the switching cost based on the context switching time period of the app #k that is assigned to the CPU #i and the expected value of the number of switching sessions between the app #k and the new app #j. The context switching time period of the app #k corresponds to the "context cost" in the use case table 400. The expected value of the number of switching sessions between the apps #j and #k corresponds to the "expected value" in the use case table 400.

For example, the second calculating unit 506 refers to the use case table 400 and calculates the switching cost by multiplying the context cost of the app #k that is assigned to the CPU #i by the expected value indicating the rate at which the app #k is switched to the app #j. The switching cost is calculated for each app #k that is assigned to the CPU #i.

The second calculating unit 506 may calculate a cost representing the total switching cost for each app #k (hereinafter, referred to as "total cost Si") by totaling the switching cost of each app #k that is assigned to the CPU #i. The specific contents of the processing by the second calculating unit 506 will be described later with reference to FIGS. 7 and 8.

The assigning unit 504 selects a CPU to be the assignment destination of the new app #j, from among the CPUs #0 to #n and based on the calculated switching cost for each app #k of the CPU #i. For example, the assigning unit 504 may select the CPU to be the assignment destination of the new app #j based on the calculated total costs S0 to Sn respectively of the CPUs #0 to #n.

For example, the assigning unit 504 identifies the lowest total cost (hereinafter, referred to as "total cost Smin") among total costs S0 to Sn respectively of the CPUs #0 to #n; selects a CPU whose total cost is the total cost Smin (hereinafter, referred to as "CPU #B") from among the CPUs #0 to #n; and assigns the app #j to the selected CPU #B.

Thereby, the app #j can be assigned to the CPU #B for which the load is least consequent to a switching between the apps, occurring associated with the assignment of the newly started up app #j. As a result, the switching between the apps #j and #k tends not to occur and, even when the switching between the apps #j and #k occurs, the app #j can be assigned to the CPU #B for which the time period consumed for the context switching is short. Therefore, an increase of the speed of the switching between the apps can be facilitated.

The third calculating unit 507 calculates the switching cost necessary for switching between the app #k that may be executed concurrently with the newly started up app #j and an app #m that is assigned to the CPU #i. The app #m is an app that may be executed concurrently with, for example, the app #k.

For example, the third calculating unit 507 calculates the switching cost that is generated when the app #i is assigned to the CPU #B and as a result, switching is executed between the app #k assigned to the CPU #B and the app #m assigned to the CPU #i that is different from the CPU #B.

For example, the third calculating unit 507 refers to the use case table 400 and calculates the switching cost by multiplying the context cost of the app #m assigned to the CPU #i by the expected value indicating the rate at which the app #m is switched to the app #k. The switching cost is calculated for each app #m that is assigned to the CPU #i (however, i≠B).

The third calculating unit 507 may calculate the cost that represents the total switching costs of the apps #m (hereinafter, referred to as "total cost S(i)") by totaling the switching costs of the apps #m that are assigned to the CPU #i. The specific contents of the processing by the third calculating unit 507 will be described later with reference to FIGS. 7 and 9.

The assigning unit 504 selects the CPU to be the assignment destination of the app #k that is assigned to the CPU #B, from among the CPUs #0 to #n and based on the calculated switching cost of each app #m of each CPU #i. For example, the assigning unit 504 may select the CPU to be the assignment destination of the app #k that is assigned to the CPU #B, based on the calculated total cost S(i) of the CPU #i.

For example, if the total cost S(i) of the CPU #i (however, i≠B) is smaller than the total cost Smin, the assigning unit 504 selects the CPU #i as the assignment destination of the app #k that is assigned to the CPU #B and moves the app #k assigned to the CPU #B to the selected CPU #i (i.e., migrates the app #k). The migration of the app #k is executed only when moving the app #k from the CPU #B to another CPU causes the load that is generated by the switching between the apps to be small on the system overall.

Thereby, the app #k assigned the CPU #B and that may be executed concurrently with the newly started up app #j can be assigned to the CPU #i for which the total cost S(i) generated associated with the assignment of the app #k and necessary for the switching between the apps is less than the total cost Smin. As a result, the load that is necessary for the switching between the apps for each CPU #i can be minimized and the performance of the entire system can be improved.

The assigning unit 504 may select, as the assignment destination of the app #k assigned to the CPU #B, the CPU #i for which the calculated total cost S(i) is the smallest and is less than the total cost Smin, from among the CPUs that are each different from the CPU #B. Thereby, the load that is necessary for the switching between the apps for each CPU #i can be further reduced and the performance of the entire system can be improved.

In the description above, the second calculating unit 506 calculates the switching cost by multiplying the context cost of the app #k assigned to the CPU #i by the expected value indicating the rate at which the app #k is switched to the app #j. However, the calculation of the switching cost is not limited hereto. For example, the second calculating unit 506 may calculate the switching cost by multiplying the context cost of the new app #j by the expected value indicating the rate at which the app #j is switched to the app #k.

In the description above, the third calculating unit 507 calculates the switching cost by multiplying the context cost of the app #m assigned to the CPU #i (i≠B) by the expected value indicating the rate at which the app #m is switched to the app #k. However, the calculation of the switching cost is not limited hereto. For example, the third calculating unit 507 may calculate the switching cost by multiplying the context cost of the app #k assigned to the CUP #i (i≠B) by the expected value indicating the rate at which the app #k is switched to the app #m.

The specific contents of the processing by the second calculating unit 506 will be described with reference to FIGS. 7 and 8. The description will be made taking the multi-core processor system 100 depicted in FIGS. 1 and 2 as an example of the multi-core processor system 300 according to the embodiment (n=1).

Figure 7:
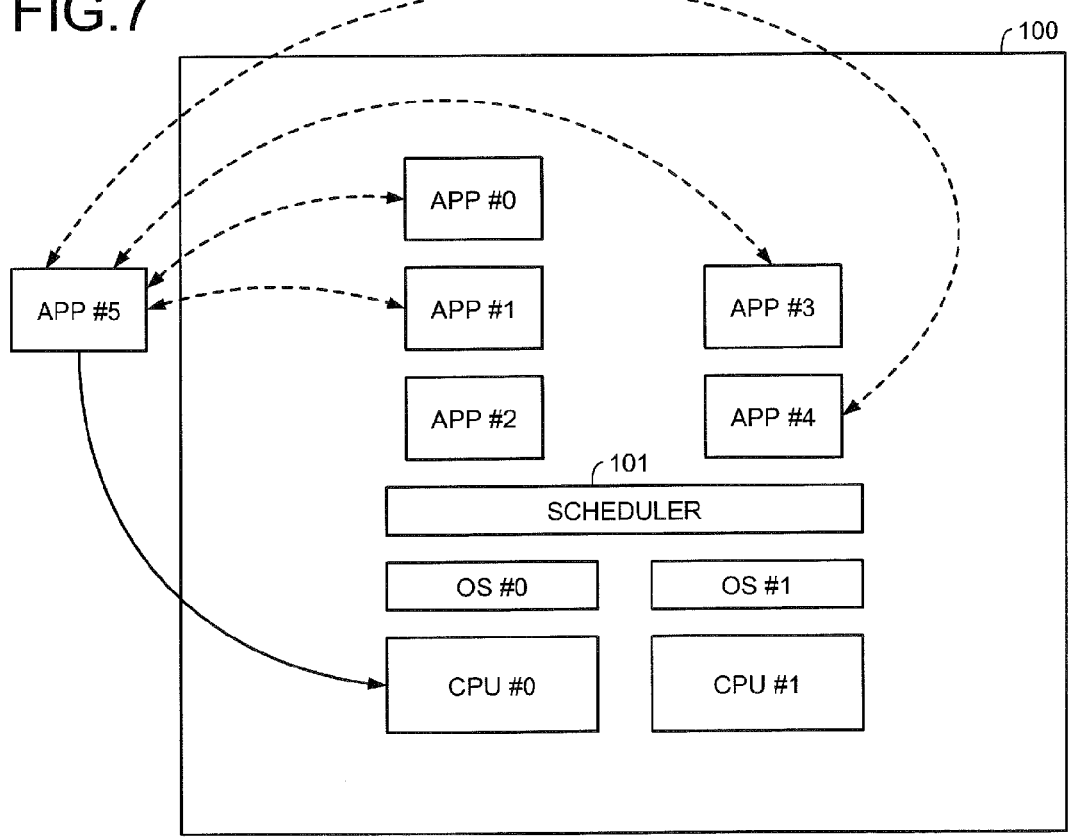
FIG. 7 is an explanatory diagram of an example of an assignment of applications.

FIG. 7 is an explanatory diagram of an example of an assignment of applications. In FIG. 7, in the multi-core processor system 100, the apps #0, #1, and #2 are assigned to the CPU #0; and the apps #3 and #4 are assigned to the CPU #1. The app #5 is a newly started up app.

Among the apps #0 to #4, the apps #0, #1, #3, and #4 may be executed concurrently with the newly started up app #5. An example will be described of the specific contents of the processing by the second calculating unit 506 that calculates the total costs S0 and S1 of the CPUs #0 and #1.

Total Cost S0 of CPU #0

The second calculating unit 506 refers to the use case table 400 and calculates the switching cost by multiplying the context cost "100 [us]" of the app #0 assigned to the CPU #0 by the expected value "0.5" indicating the rate at which the app #0 is switched to the app #5. As a result, the switching cost "50 [us]" is calculated as expressed in Eq. (1) below.

$$\text{app \#0: } 100 \text{ [us]} \times 0.5 = 50 \text{ [us]} \quad (1)$$

The second calculating unit 506 refers to the use case table 400 and calculates the switching cost by multiplying the context cost "1 [ms]" of the app #1 assigned to the CPU #0 by the expected value "0.1" indicating the rate at which the app #1 is switched to the app #5. As a result, the switching cost "100 [us]" is calculated as expressed in Eq. (2) below.

$$\text{app \#1: } 1.1 \text{ [ms]} \times 0.1 = 100 \text{ [us]} \quad (2)$$

The second calculating unit 506 calculates the total cost S0 by totaling the switching costs of the apps #0 and #1 that are assigned to the CPU #0. In this case, the total cost S0 "150 [us]" is calculated.

Total Cost S1 of CPU #1

The second calculating unit 506 refers to the use case table 400 and calculates the switching cost by multiplying the context cost "500 [us]" of the app #3 assigned to the CPU #1 by the expected value "0.25" indicating the rate at which the app #3 is switched to the app #5. As a result, the switching cost "125 [us]" is calculated as expressed in Eq. (3) below.

$$\text{app \#3: } 500 \text{ [us]} \times 0.25 = 125 \text{ [us]} \quad (3)$$

The second calculating unit 506 refers to the use case table 400 and calculates the switching cost by multiplying the context cost "250 [us]" of the app #4 assigned to the CPU #1 by the expected value "0.3" indicating the rate at which the app #4 is switched to the app #5. As a result, the switching cost "75 [us]" is calculated as expressed in Eq. (4) below.

$$\text{app \#4: } 250 \text{ [us]} \times 0.3 = 75 \text{ [us]} \quad (4)$$

The second calculating unit 506 calculates the total cost S1 by totaling the switching costs of the apps #3 and #4 that are assigned to the CPU #1. In this case, the total cost S1 "200 [us]" is calculated.

The calculated total costs S0 and S1 are stored in, for example, a candidate-assignment-destination cost table 800 depicted in FIG. 8. The candidate-assignment-destination cost table 800 is implemented by, for example, the primary cache 301-1, the secondary cache 303, or the memory 306. The candidate-assignment-destination cost table 800 will be described.

FIG. 8 is an explanatory diagram of an example of the storage contents of the candidate-assignment-destination cost table. In FIG. 8, the candidate-assignment-destination cost table 800 stores the total costs S0 and S1 respectively for the CPUs #0 and #1. For example, the assigning unit 504 refers to the candidate-assignment-destination cost table 800 and assigns the app #5 to the CPU #0 whose total cost Si is the smallest among the CPUs #0 and #1.

The specific contents of the processing by the third calculating unit 507 will be described with reference to FIGS. 7 and 9. The description will be made taking a case where it is determined whether the apps #0 and #1 assigned to the CPU #0 as the result of the assignment of the app #5 to the CPU #0 are to migrated (moved) to the CPU #1, as an example.

An example will be described of the specific contents of the processing by the third calculating unit 507 that calculates, for each of the apps #0 and #1 assigned to the CPU #0, the total cost S(1) that is necessary when the switching is executed between the app #m assigned to the CPU #1 and the apps #0 and #1.

Total Cost S(1) of App #0

The third calculating unit 507 refers to the use case table 400 and calculates the switching cost by multiplying the context cost "500 [us]" of the app #3 assigned to the CPU #1 by the expected value "0.4" indicating the rate at which the app #3 is switched to the app #0. As a result, the switching cost "200 [us]" is calculated as expressed in Eq. (5) below.

$$\text{app \#3: } 500 \text{ [us]} \times 0.4 = 200 \text{ [us]} \quad (5)$$

The third calculating unit 507 refers to the use case table 400 and calculates the switching cost by multiplying the context cost "250 [us]" of the app #4 assigned to the CPU #1 by the expected value "0.6" indicating the rate at which the app #4 is switched to the app #0. As a result, the switching cost "150 [us]" is calculated as expressed in Eq. (6) below.

$$\text{app \#4: } 250 \text{ [us]} \times 0.6 = 150 \text{ [us]} \quad (6)$$

The third calculating unit 507 calculates the total cost S(1) by totaling the switching costs of the apps #3 and #4 that are assigned to the CPU #1. In this case, for the app #0, the total cost S(1) "350 [us]" is calculated.

Total Cost S(1) of App #1

The third calculating unit 507 refers to the use case table 400 and calculates the switching cost by multiplying the context cost "500 [us]" of the app #3 assigned to the CPU #1 by the expected value "0.5" indicating the rate at which the app #3 is switched to the app #1. As a result, the switching cost "250 [us]" is calculated as expressed in Eq. (7) below.

$$app\ \#3: 500\ [us] \times 0.5 = 250\ [us] \quad (7)$$

The third calculating unit 507 refers to the use case table 400 and calculates the switching cost by multiplying the context cost "250 [us]" of the app #4 assigned to the CPU #1 by the expected value "0.6" indicating the rate at which the app #4 is switched to the app #1. As a result, the switching cost "150 [us]" is calculated as expressed in Eq. (8) below.

$$app\ \#4: 250\ [us] \times 0.6 = 150\ [us] \quad (8)$$

The third calculating unit 507 calculates for the app #1, the total cost S(1) by totaling the switching costs of the apps #3 and #4 that are assigned to the CPU #1. In this case, the total cost S(1) "400 [us]" is calculated.

The calculated total cost S(1) of each of the apps #0 and #1 is stored in, for example, a candidate-migration-destination cost table 900 depicted in FIG. 9. The candidate-migration-destination cost table 900 is implemented by, for example, the primary cache 301-1, the secondary cache 303, and the memory 306. The candidate-migration-destination cost table 900 will be described.

FIG. 9 is an explanatory diagram of an example of the storage contents of the candidate-migration-destination cost table 900. In FIG. 9, the candidate-migration-destination cost table 900 stores the total cost S(1) for a case where each of the apps #0 and #1 assigned to the CPU #0 is migrated to the CPU #1.

The assigning unit 504 may refer to the candidate-migration-destination cost table 900 and may select the CPU to be the assignment destination of the app #0 assigned to the CPU #0. The total cost Smin is the above total cost S0 that is "150 us". Therefore, the total cost S(1) that is "350 [us]" of the app #0 is larger than the total cost Smin. In this case, the assigning unit 504 does not change the assignment destination of the app #0 assigned to the CPU #0. No migration of the app #0 is executed.

The assigning unit 504 refers to the candidate-migration-destination cost table 900 and selects the CPU to be the assignment destination of the app #1 assigned to the CPU #0. The total cost S(1) that is "400 [us]" of the app #1 is larger than the total cost Smin. In this case, the assigning unit 504 does not change the assignment destination of the app #1 assigned to the CPU #0. No migration of the app #1 is executed.

A procedure for the scheduling process executed by the scheduler 101 according to the embodiment will be described.

FIGS. 10 and 11 are flowcharts of an example of a procedure for the scheduling process executed by the scheduler according to the embodiment. In the flowchart of FIG. 10, the receiving unit 501 determines whether start-up notification for the new app #j has been received (step S1001).

The receiving unit 501 waits for the start-up notification for the new app #j to be received (step S1001: NO). When the receiving unit 501 determines that start-up notification for the new app #j has been received (step S1001: YES), the identifying unit 502 refers to the use case table 400 and identifies the app #k that has potential of being executed concurrently with the app #j for which the start-up notification has been received (step S1002).

The detecting unit 503 detects a CPU that has not been assigned the app #k that may be executed concurrently with the new app #j, from among the CPUs #0 to #n in the multi-core processor system 300 (step S1003).

Thereafter, the assigning unit 504 determines whether the detecting unit 503 detects a CPU that has not been assigned the app #k that may be executed concurrently with the new app #j (step S1004). If the assigning unit 504 determines that the detecting unit 503 detects no such CPU (step S1004: NO), the procedure advances to step S1101 depicted in FIG. 11.

On the other hand, if the assigning unit 504 determines that the detecting unit 503 has detected such a CPU (step S1004: YES), the assigning unit 504 determines whether the detecting unit 503 detects such CPUs in plural (step S1005). If the assigning unit 504 determines that the detecting unit 503 does not detect such CPUs in plural (step S1005: NO), the assigning unit 504 assigns the app #j to the detected CPU #A (step S1006) and the series of process steps according to the flowchart comes to an end.

On the other hand, if the assigning unit 504 determines that the detecting unit 503 has detected such CPUs in plural (step S1005: YES), the first calculating unit 505 calculates the load on each of the detected CPUs (step S1007). The assigning unit 504 assigns the app #j to the CPU #A for which the calculated load is the lowest, among the detected plural CPUs (step S1008) and the series of process steps according to the flowchart comes to an end.

In the flowchart of FIG. 11, the second calculating unit 506 sets "i" of the CPU #i to be "0" (step S1101); selects the CPU #i from among the CPUs #0 to #n (step S1102); and selects the app #k from among the apps that are assigned to the CPU #i (step S1103).

Thereafter, the second calculating unit 506: calculates the switching cost necessary for switching between the new app #j and the selected app #k (step S1104); and determines whether any app #k remains unselected among the apps assigned to the CPU #i (step S1105).

If the second calculating unit 506 determines that an unselected app #k remains (step S1105: YES), the procedure returns to step S1103. On the other hand, if the second calculating unit 506 determines that no unselected app #k remains (step S1105: NO), the second calculating unit 506 calculates the total cost Si that represents the total of the calculated switching costs of the apps #k (step S1106).

The second calculating unit 506 increments "i" of the CPU #i (step S1107) and determines whether "i" is greater than "n" (step S1108). If the second calculating unit 506 determines that "i" is equal to or less than "n" (step S1108: NO), the procedure returns to step S1102.

On the other hand, if the second calculating unit 506 determines that "i" is greater than "n" (step S1108: YES), the assigning unit 504 identifies the lowest total cost Smin among the total costs S0 to Sn of the CPUs #0 to #n (step S1109) and assigns the app #j to the CPU #B having the total cost Smin, among the CPUs #0 to #n (step S1110).

The assigning unit 504 executes a migration process with respect to the app #k assigned to the CPU #B (step S1111) and the series of process steps according to the flowchart comes to an end.

Thus, the new app #j can be assigned to the CPU #A that has not been assigned the app #k that has a high potential of being executed concurrently with the app #j. If the CPU #A is not present, the app #j can be assigned to the CPU #B for which the load that is necessary for the switching between the apps and generated associated with the assignment of the newly started up app #j, is the least.

A specific process procedure for the migration process at step S1111 depicted in FIG. 11 will be described.

Figure 12:
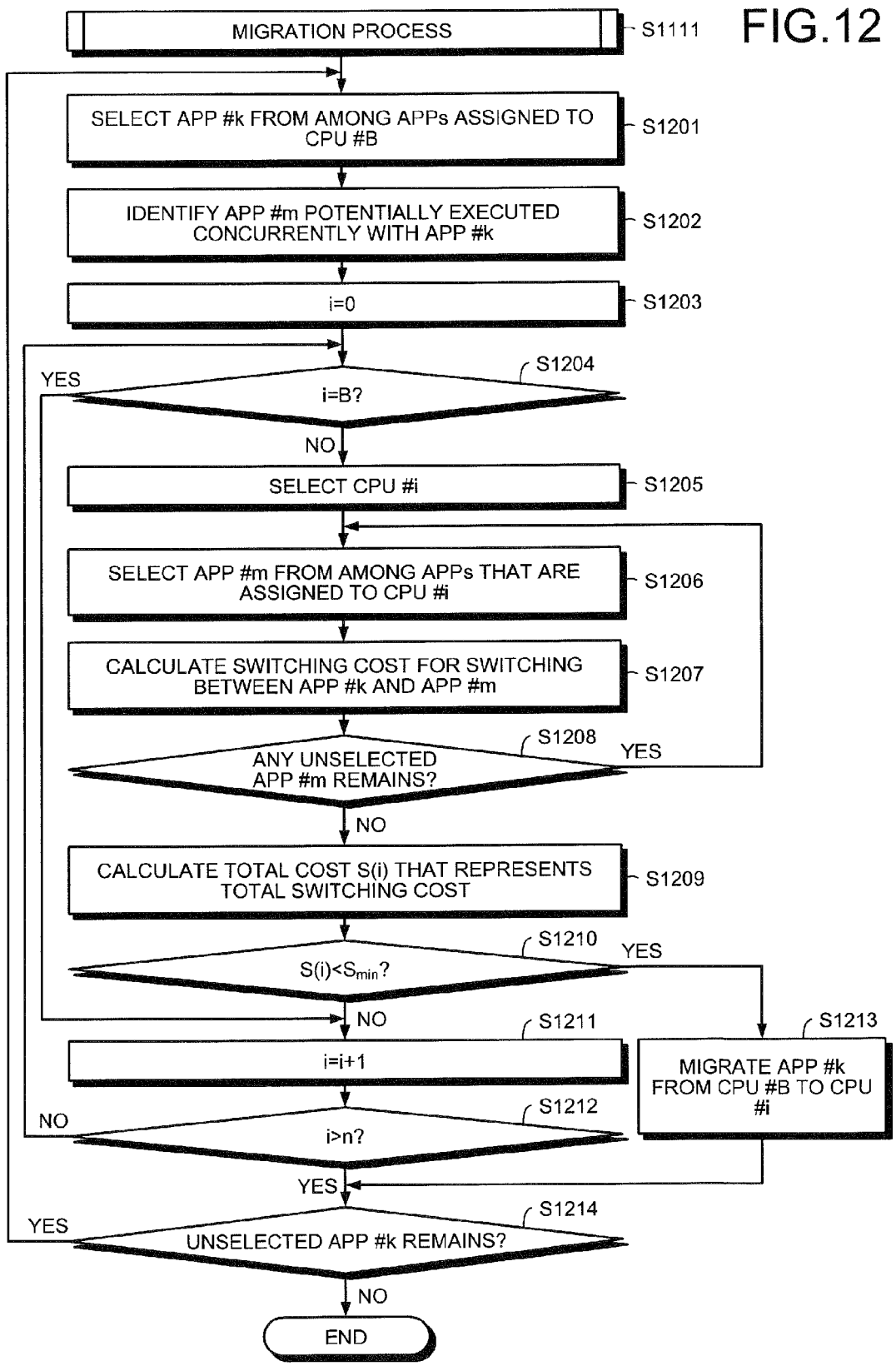
FIG. 12 is a flowchart of an example of a process procedure for a migration process.

FIG. 12 is a flowchart of an example of a specific process procedure for the migration process. In FIG. 12, the third calculating unit 507 selects the app #k from among the apps assigned to the CPU #B (step S1201), refers to the use case table 400, and identifies the app #m that may be executed concurrently with the app #k (step S1202).

The third calculating unit 507 sets "i" of the CPU #i to be "0" (step S1203) and determines whether "i" of the CPU #i is equivalent to "B" of the CPU #B (step S1204). If the third calculating unit 507 determines that "i" of the CPU #i is equivalent to "B" of the CPU #B (step S1204: YES), the procedure advances to step S1211.

On the other hand, if the third calculating unit 507 determines that "i" of the CPU #i is not equivalent to "B" of the CPU #B (step S1204: NO), the third calculating unit 507 selects the CPU #i from among the CPUs #0 to #n (step S1205) and selects the app #m from among the apps that are assigned to the CPU #i (step S1206).

The third calculating unit 507 calculates the switching cost necessary for the switching between the app #k and the selected app #m (step S1207) and determines whether any unselected app #m remains among the apps assigned to the CPU #i (step S1208).

If the third calculating unit 507 determines that an unselected app #m remains (step S1208: YES), the procedure returns to step S1206. On the other hand, if the third calculating unit 507 determines that no unselected app #m remains (step S1208: NO), the third calculating unit 507 calculates the total cost S(i) that represents the total of the calculated switching costs of the apps #m (step S1209).

The assigning unit 504 determines whether the total cost S(i) of the CPU #i is less than the total cost Smin that is identified at step S1109 depicted in FIG. 11 (step S1210). If the assigning unit 504 determines that the total cost S(i) of the CPU #i is greater than or equal to the total cost Smin (step S1210: NO), the third calculating unit 507 increments "i" of the CPU #i (step S1211) and determines whether "i" is greater than "n" (step S1212).

If the third calculating unit 507 determines that "i" is less or equal to "n" (step S1212: NO), the procedure returns to step S1204. On the other hand, if the third calculating unit 507 determines that "i" is greater than "n" (step S1212: YES), the procedure advances to step S1214.

If the assigning unit 504 determines at step S1210 that the total cost S(i) of the CPU #i is less than the total cost Smin (step S1210: YES), the assigning unit 504 migrates the app #k assigned to the CPU #B to the CPU #i (step S1213).

The third calculating unit 507 determines whether any unselected app #k remains among the apps assigned to the CPU #B (step S1214). If the third calculating unit 507 determines that an unselected app #k remains (step S1214: YES), the procedure returns to step S1201. On the other hand, if the third calculating unit 507 determines that no unselected app #k remains (step S1214: NO), the series of process steps according to the flowchart comes to an end.

Thus, the app #k of the CPU #B and that may be executed concurrently with the newly started up app #j can be assigned to the other CPU for which the load that is necessary for the switching between the apps, occurring associated with the assignment of the app #k, is the lowest.

As described, according to the scheduler 101 according to the embodiment, the new app #j can be assigned to the CPU #A, which has not been assigned the app #k that has a high potential of being executed concurrently with app #j. As a result, when any switching occurs between the apps #j and #k, saving and loading of the context information concerning the app #j and of the app #k are unnecessary and therefore, the switching between the apps can be executed at a high speed.

According to the scheduler 101, the new app #j can be assigned to the CPU #A for which the load is the lowest, among the CPUs that have not been assigned the app #k that has a high potential of being executed concurrently with the app j. As a result, the switching between the apps can be executed at a high speed and the load can be distributed among the CPUs #0 to #n. Consequently, the performance of the entire system can be improved.

According to the scheduler 101, if the CPU #A is not present, the app #j can be assigned to the CPU #B for which the load that is necessary for the switching between the apps, occurring associated with the assignment of the newly started up app #j, is the lowest. As a result, the app #j can be assigned to the CPU #B for which the switching between the apps #j and #k tends not to occur and for which the time period necessary for the context switching is short even if switching between the apps #j and #k occurs. Therefore, an increase in the speed of the switching between the apps can be facilitated.

According to the scheduler 101, the app #k of the CPU #B that may be executed concurrently with the newly started up app #j can be migrated to the CPU #i for which the total cost S(i) is less than the total cost Smin, which is necessary for the switching between the apps occurring associated with the migration of the app #k. As a result, the load that is necessary for the switching between the apps for each CPU #j can be minimized and therefore, the performance of the entire system can be improved.

According to the scheduler 101, the app #k of the CPU #B can be migrated to the CPU #i for which the total cost S(i) necessary for the switching between the apps, occurring associated with the migration of the app #k, is the lowest and is less than the total cost Smin. Thereby, the load necessary for the switching between the apps for the CPU #i can be further reduced and the performance of the entire system can be improved.

As described, according to the scheduling method and the scheduling system, improvements in performance, reductions in power consumption, and increases in the speed at which applications are switched can be facilitated.

The scheduling method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to an aspect of the present embodiments, an effect is achieved that the speed at which applications are switched can be increased.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method executed by a scheduler that manages a plurality of processors, the scheduling method comprising:
   calculating, for each of the processors, based on an application information table and upon receiving start-up notification for a first application,
   a total of a switching cost for switching each of a plurality of second applications assigned to the respective processor to the first application, the switching cost for each of the second applications being based on a time period for switching of context of the respective second application and an expected number of switches between the respective second application and the first application; and
   selecting, based on the totals calculated for each of the processors, a first processor, from among the processors, to execute the first application.

2. The scheduling method according to claim 1, wherein each of the second applications is an application other than a concurrently executed application that is registered in the application information table as having a potential of being executed concurrently with the first application.

3. The scheduling method according to claim 2, wherein the application information table includes, for the first application and each of the second applications, context information of the application.

4. The scheduling method according to claim 1, further comprising:
   calculating, based on the application information table, a switching cost required for switching a third application executed by at least one of the processors to each of the second applications, and
   selecting, based on the switching cost, a second processor to execute each of the second applications.

5. A scheduling system comprising:
   a plurality of processors; and
   a scheduler that manages the processors, wherein
   the scheduler, upon receiving start-up notification for a first application, calculates for each of the processors, based on an application information table,
   a total cost, a total of a switching cost for switching each of a plurality of second applications assigned to the respective processor to the first application, the switching cost for each of the second applications being based on a time period for switching of context of the respective second application and an expected number of switches between the respective second application and the first application, and
   the scheduler selects, based on the totals calculated for each of the processors, a first processor, from among the processors, to execute the first application.

* * * * *